United States Patent
Nielsen et al.

(10) Patent No.: US 10,516,911 B1
(45) Date of Patent: Dec. 24, 2019

(54) CROWD-SOURCED MEDIA GENERATION

(71) Applicant: Amazon Technologies, Inc., Reno, NV (US)

(72) Inventors: Olaf Nielsen, Portland, OR (US); Steven Swanson, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/278,012

(22) Filed: Sep. 27, 2016

(51) Int. Cl.
| | |
|---|---|
| *H04N 5/445* | (2011.01) |
| *H04N 21/431* | (2011.01) |
| *H04N 21/43* | (2011.01) |
| *H04N 21/2365* | (2011.01) |
| *H04N 21/41* | (2011.01) |

(52) U.S. Cl.
CPC ....... *H04N 21/431* (2013.01); *H04N 21/2365* (2013.01); *H04N 21/4126* (2013.01); *H04N 21/4305* (2013.01); *H04N 21/4307* (2013.01)

(58) Field of Classification Search
CPC ............. H04N 21/431; H04N 21/2365; H04N 21/4126; H04N 21/4305; H04N 21/4307; H04N 21/242; H04N 21/816; H04N 21/23424
USPC ............................... 725/37, 60, 87, 112, 115
See application file for complete search history.

(56) References Cited

U.S. PATENT DOCUMENTS

| | | | | |
|---|---|---|---|---|
| 9,679,069 | B2* | 6/2017 | Kocks | G06F 17/30867 |
| 2002/0049979 | A1* | 4/2002 | White | G11B 27/034 |
| | | | | 725/87 |
| 2007/0143493 | A1* | 6/2007 | Mullig | G06F 17/30017 |
| | | | | 709/232 |
| 2012/0206653 | A1* | 8/2012 | Graves | G11B 27/031 |
| | | | | 348/571 |
| 2013/0070093 | A1* | 3/2013 | Rivera | G11B 27/002 |
| | | | | 348/143 |
| 2014/0068681 | A1* | 3/2014 | Lemmey | H04N 21/242 |
| | | | | 725/74 |
| 2015/0016661 | A1* | 1/2015 | Lord | H04N 21/42203 |
| | | | | 382/100 |

* cited by examiner

*Primary Examiner* — Jivka A Rabovianski
(74) *Attorney, Agent, or Firm* — Hogan Lovells US LLP

(57) ABSTRACT

Media content relating to an event can be obtained from multiple sources, such as multiple client devices associated with various users. The uploaded media can be associated with an event or identified as related to an event based upon location and timing information. The obtained media can be analyzed, and one or more filters applied to remove clips that do not satisfy certain selection criteria. Selected clips are ordered sequentially and synchronized by time code, and at least a primary audio track obtained from the devices is selected and synchronized with the video content. The content can be arranged per a determined layout, stitched together, and encoded into a single output file or stream. Media players can obtain and present the content, and can potentially switch the audio tracks or display individual clips from the output file.

20 Claims, 9 Drawing Sheets

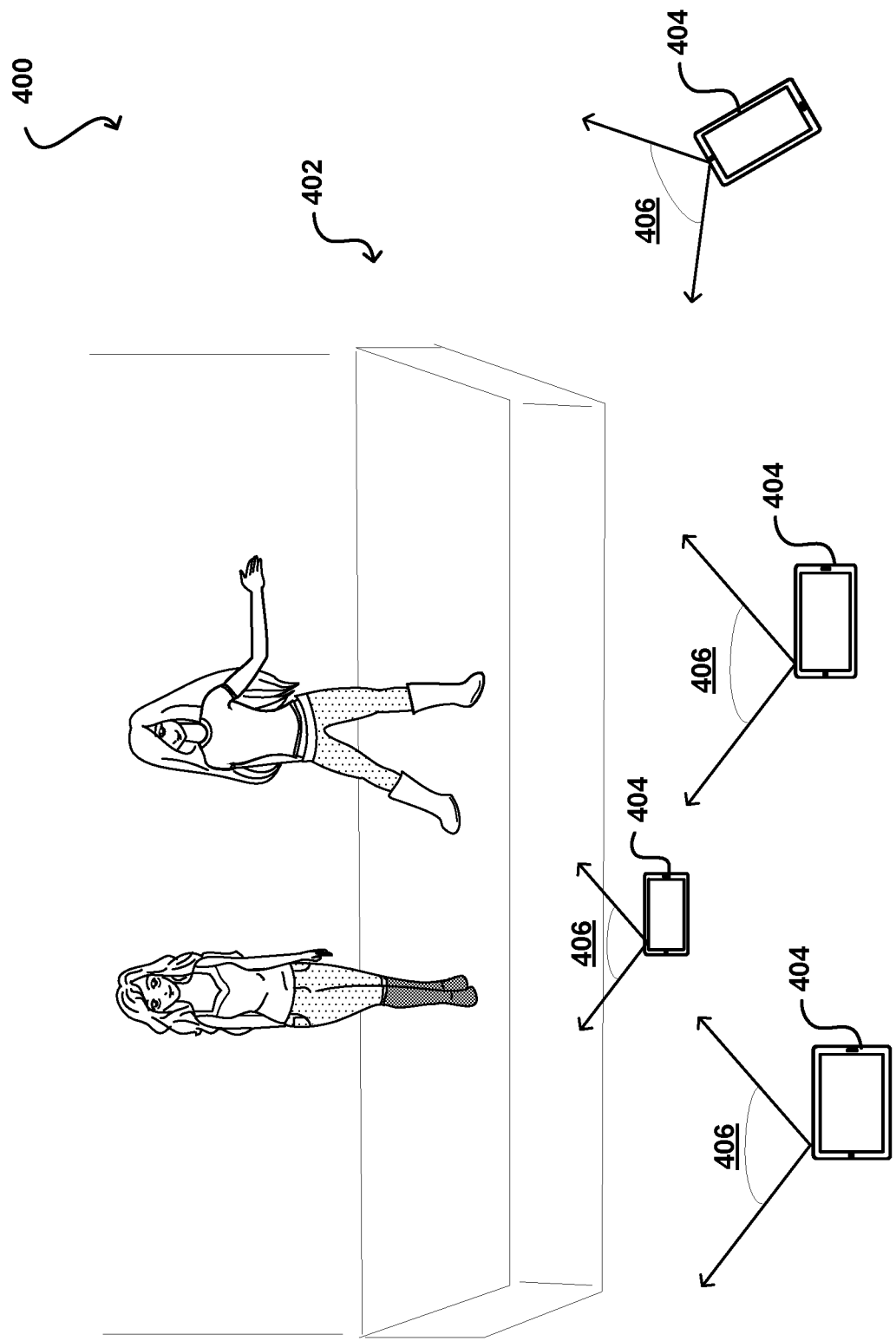

CROWD-SOURCED MEDIA GENERATION

BACKGROUND

Users are increasingly obtaining content in digital format, often downloading or streaming that content from a remote service. In many cases the content will be uploaded by a user, where that user caused the content to be captured using a portable computing device. For an event such as a concert or performance, there may be many different versions including different views or captures of the event that are uploaded by different users. A user wanting to view content for the event may have to manually locate, select, and view at least a number of these separate files in order to obtain a version that is of interest to that user. Further, if the files represent only portions of the event, then the user must search for multiple versions to access all the different portions, which can be at least inconvenient if not frustrating for the user, and can result in an increase in computing resources required for the viewing.

BRIEF DESCRIPTION OF THE DRAWINGS

Various embodiments in accordance with the present disclosure will be described with reference to the drawings, in which:

FIG. 4 illustrates an example situation in which multiple computing devices are capturing media content for an event that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the presentation of media content for an event or occurrence. In particular, various embodiments provide for the crowd-sourcing of media content, wherein multiple electronic devices are able to upload media content, such as audio and video clips (as files or streams), to a content provider system or service. A link or destination for uploading media content may be created, for example by a content provider, and then may be provided to multiple electronic devices. The media can be uploaded to a specific interface or address for an event, can be tagged as associated with an event, or can be determined to be related to an event based upon location and timing information, among other such options. The obtained content can be analyzed, and one or more filters applied to remove clips that do not satisfy certain selection criteria, such as resolution, format, or aspect ratio. The selected clips can be ordered sequentially and synchronized by time code. At least a primary audio track obtained from the devices can also be selected. The content can be stitched together and encoded into a single output, such as a stream or file, having specified aspects, such as resolution or format. The output can then be provided for consumption by various client devices. Certain media players or other applications may have the ability to switch the audio tracks or display individual clips from the single output, while some content services may support the providing of different streams or files that are specific to these changes.

Various other such functions can be used as well within the scope of the various embodiments as would be apparent to one of ordinary skill in the art in light of the teachings and suggestions contained herein.

Figure 1:
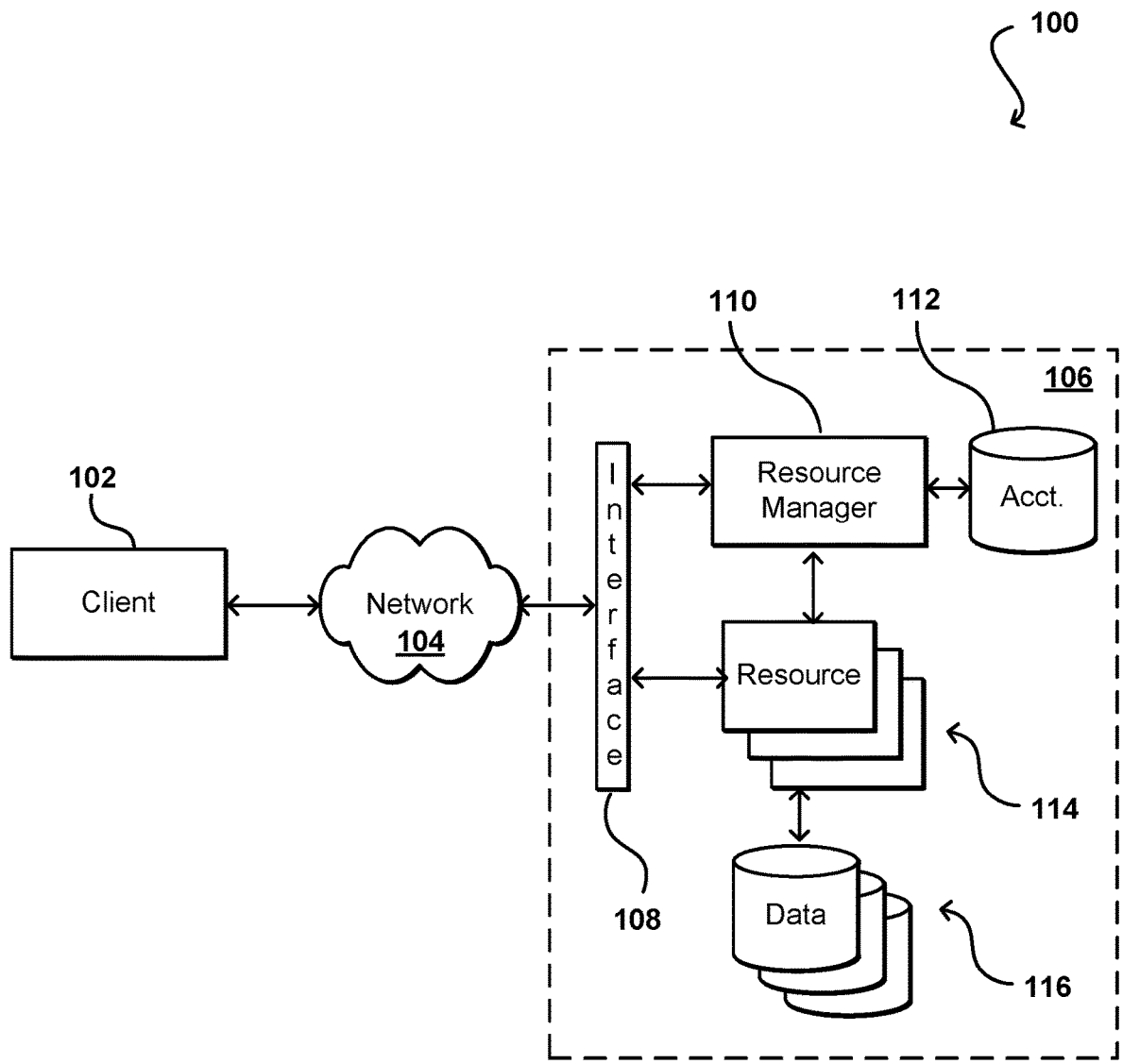
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
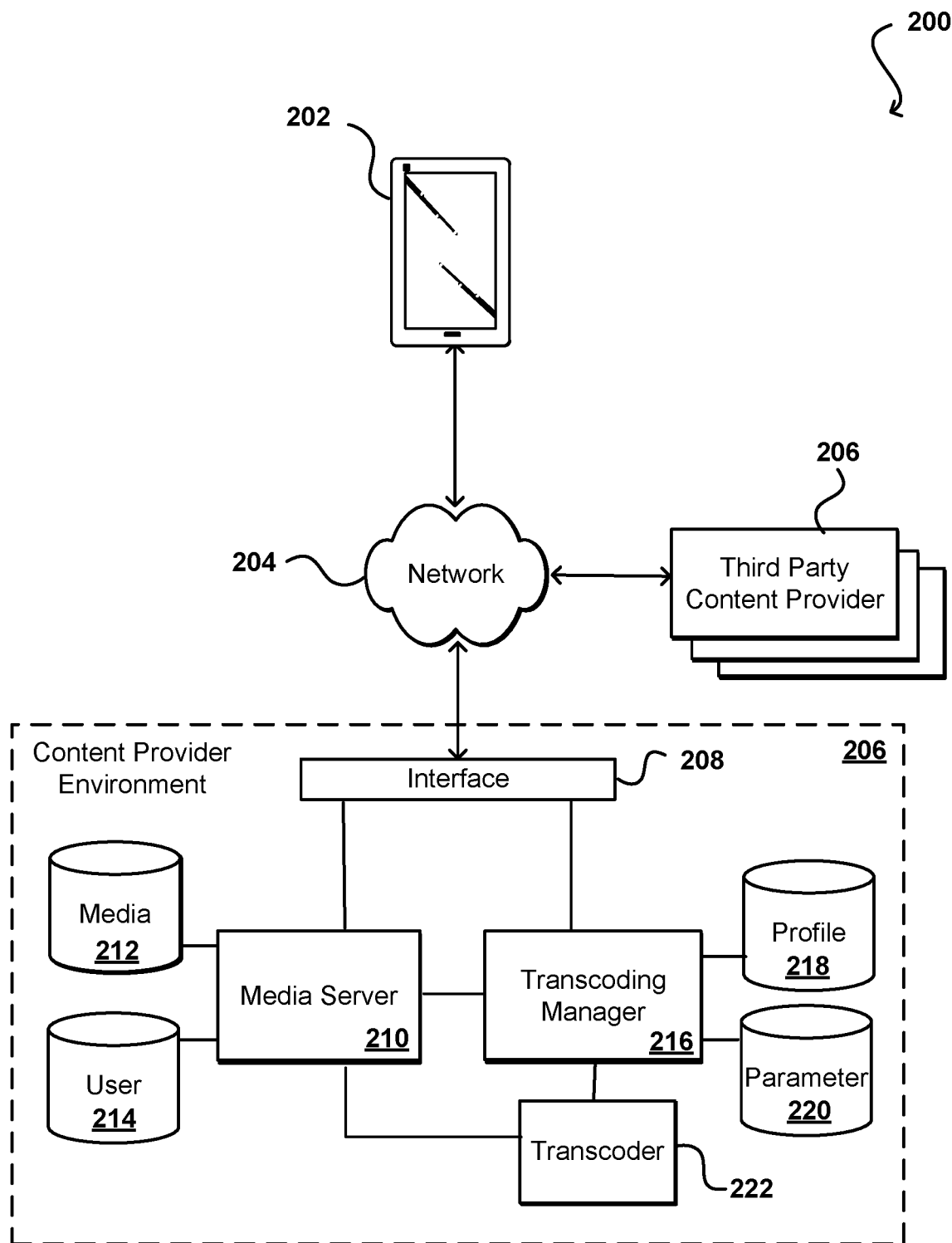
FIG. 2 illustrates an example subsystem for managing media encoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 208. As mentioned, in at least some embodiments the request can include a request for content to be displayed on the computing device 202, and in many cases will include video or other media content that is encoded for presentation on the client device 202. The network(s) can include any appropriate network, such as the Internet, a local area network (LAN), a cellular network, an Ethernet, or other such wired and/or wireless network. The content provider environment 208 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 212 while a request to specify encoding parameters might be forwarded to a encoding manager 216, among other such options. These calls or requests can also come from third parties, although third party providers 506 can also provide at least some of the media content to be stored to a media repository 212 and encoded for display on the client device 202 as discussed herein.

In this example, a call received to the content provider environment 208 can be received by an interface layer 210 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from an operator, an administrator, a client device 202, a third party provider 224, or another such source might include a request to specify one or more sets of encoding parameters to be used with a media file. Accordingly, information regarding the encoding parameters can be provided to a encoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the encoding manager 216 can use the profile and parameter data to determine the appropriate encoding information, and can pass that to one or more encoders 222, which can obtain the media file and encode the media file per the encoding information, which can then be provided to the client device by a media server 210 or other such component.

Figure 3:
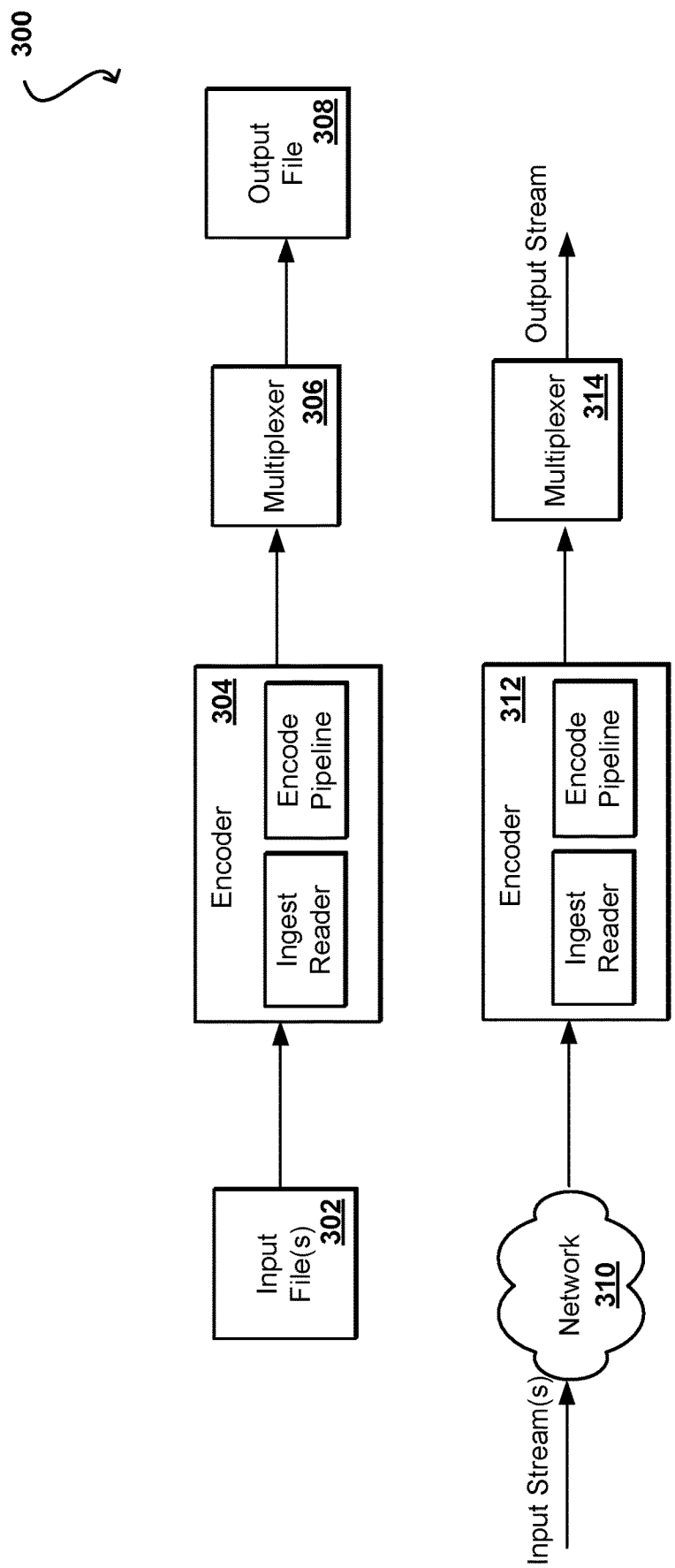
FIG. 3 illustrates an example encoding subsystem that can be utilized in accordance with various embodiments.

In some embodiments the encoding subsystem includes one or more encoders, a set of bitstreams (or video signals), and a content delivery network. Various encoders 304, 312 are illustrated in the example configuration 300 of FIG. 3. The one or more encoders can include both encoders and packagers, which can be implemented via an origin server. A packager can receive a signal (e.g., feed), such as a video signal, a media input file 302, or a live stream over at least one network 310. In this example there is an encoder 304 for the input media files and an encoder 312 for the input streams, with each having a respective multiplexer 306, 314, or sharing a multiplexer, for generating the output file 308 or stream. A live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN). The bitstreams can represent various encoded/packaged versions of the signal feed, as may be encoded per the encoding parameters from the encoding manager. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well.

As mentioned, the media content obtained by such a system can be provided from any of a number of different sources. For example, content might be obtained from a production company or third party provider. In other instances, the content can be provided by one or more users that have captured or otherwise obtained audio, video, or other media content using, for example, a portable electronic device. As an example, FIG. 4 illustrates a situation 400 wherein a number of different users are attending an event. At various times throughout the event, users might use their respective devices 404, such as smartphones, tablet computers, digital cameras, or wearable computers, to capture images, audio, and/or video of the event. Each user can be in at least a slightly different location, such that the image content captured in a field of view 406 of each device will be at least slightly different. Further, users can adjust zoom levels and other settings, and the capabilities of the various devices can be different, such that many different representations of the event can be captured by these various devices. As known for media capture, these users can cause at least some of this captured media to be uploaded to a central location or service, such as a streaming media service or social network. Users can then view this content from various devices, and in at least some embodiments the media can be accessible to various other users as well.

Certain conventional systems will allow users to tag or classify media files, such that a user accessing a site or service can navigate to a location from which these various media files can be obtained. There is currently no publicly accessible service, however, that enables these media files to be aggregated in such a way as to create a crowd-sourced media file that is representative of an entirety of an event. Currently, users must access the various files and attempt to determine which of the files will be most appropriate or interesting for that user. For example, for a concert event some users like close-up shots of band members while other prefer wide-angle shots of the overall stage. There will also be different levels of quality, based on factors such as location, device capabilities, steadiness of the use, and people near the location of the device, among other such reasons. There is no way for a user to currently obtain multiple concurrently running, synchronized views or clips of an event, particularly one that enables the user to switch between the various audio and video clips. There is also currently no way for the user-submitted media to be automatically aggregated into a single stream or file that can be accessed by multiple devices.

Accordingly, approaches in accordance with various embodiments provide for the collection and aggregation of media input from multiple sources. In particular, various embodiments enable media content, such as streaming video or video files, to be uploaded or otherwise obtained from a plurality of different user devices. According to various embodiments, an entity such as an administrator, service provider, etc. may cause a destination to be generated to which the media content may be transmitted. For example, an administrator may create a link (e.g., a URL) to which content may be uploaded, which destination may reference a storage object (e.g., a server, a cloud computing storage destination such as an S3 bucket, etc.). In various embodiments, parameters (e.g., a profile) may be associated with the link or destination that operate to associate disparate media content from an event, which content may then be combined according to various techniques based on at least the parameters, etc. Multiple links and/or destinations may be associated with different aspects of a single event; for example, a football game where multiple users are recording video may have one link for recorded content from an endzone view and another link for content from a sideline view. Links may be generated for single events in various ways; for example, for events within an event, such as for each touchdown by a particular team in a football game, for each encore at a concert, etc. The administrator/service provider is thus able to segregate the video files so they can be combined in a particular way associated with that particular link/destination/bucket.

The media content can be aggregated into a single media output (e.g., an output file, stream, or feed), for example, that can enable a viewer to concurrently view video from several different sources that is synchronized in time. The media output can have a primary audio track that is configured as the default audio during playback. In at least some embodiments, such as where a viewer is viewing the content through an application or media player that supports such functionality, the viewer can change the audio track to the audio that was originally captured for one of the video clips aggregated and currently being played through the media player. In some embodiments, the user can also have the option of viewing individual clips as opposed to an aggregated array or layout, and in some cases can even switch between individual video clips. In some embodiments the player will select the appropriate content to display or present, while in other embodiments appropriate requests can be sent to a content delivery network, which can then change or adapt the feed that is being provided for presentation via that particular player.

In the example situation 400 illustrated in FIG. 4, there is an event or occurrence for which multiple users may want to capture and/or obtain content. In some instances this will be a pre-planned event, such as a concert or performance, while in other instances this will be a spontaneous or otherwise unofficial event, such as a public street performance. For either instance there can be determined start and end times for the performance. For scheduled events this can be determined in advance, while for other types of events the times of the video and/or capture of the event can be used to determine appropriate start and end times. Such information can also be utilized for scheduled events that may not have started or ended at the scheduled times. As will be discussed in more detail later herein, a user in some embodiments can sign up in advance to provide content for a planned event, while users can select during an unplanned event to start uploading media content, among other such options.

In either situation, the triggering of a recognized "event," such as the uploading of audio, video, or other media content from a location, where that uploading is tagged or otherwise indicated to correspond to an event or occurrence, can enable content from other users to be received and associated with that event. In some embodiments the event identification can occur after the fact, such as upon analyzing media content that was captured from multiple devices in a same general location over a same general period of time, etc. A portal or other interface or entry point to a data upload service can be advertised, published, or otherwise identified such that users can locate the portal associated with that event and cause associated media to be uploaded to that portal. This can include, for example, several users of a service capturing video of an event through an application, where before (or after) the upload begins the user can select a portal from a set of options. In at least some embodiments a list of one or more suggested portals can be provided based at least in part upon the current location of the user, as may be determined using a GPS device or other such positioning mechanism, and the events identified near that location at, or near, a time of the upload. The data uploaded data received to the portal can be stored to a determined location and/or tagged or identified with certain information enabling that data to be associated with that event. For streaming content, media coming through the portal might be analyzed, aggregated, and then provided as an output stream for consumption by various users, while in other embodiments the content might get stored to a repository of the data upload service for subsequent analysis. In some embodiments a streaming option might be provided, but the data also written to a repository for subsequent analysis and/or downloading, etc.

In some embodiments an amount of filtering may be performed before the uploading in order to reduce the amount of data that is unnecessarily transmitted, as well as to reduce the amount of data to be processed. For example, data may need to be captured from a location within a specified distance of a point of occurrence of the event, where the specified distance may vary with the type of event. For example, a street performance might need to be captured within a fifty foot radius, while an outdoor festival concert might be able to be captured within a five hundred foot radius, among other such options. These can be determined automatically or specified by a user creating the event, among other such options. In some embodiments content can only be uploaded that was captured between a beginning time and an end time for the event, or within a threshold period of time before and after an event. For example, upload might be able to start five to ten minutes before the start of a concert and up to thirty minutes after the end of the concert, in order to enable capture of media if the event runs over time, with the thinking that most users will stop capturing video once the event is over. In some embodiments the end time might be based at least in part upon when a majority of uploading users stop uploading or a lack of determinable content being uploaded for the event, among other such options. This can ensure that only data that might be included in the event output file is uploaded for processing. Various other filters can be used as well, as may be based upon video format, video orientation, resolution ranges, minimum contrast or clarity values, determined levels of background noise, presence of static video (e.g., static image or black image), maximum (or minimum) clip length or size, and the like. In some embodiments these filters are applied by the media capture application in order to ensure that some or all of these criteria are applied before any content is uploaded for a particular event.

In some embodiments the filters may be applied and/or determined by the upload service, with some of the filter information being provided to the media upload applications or processes executing on the various client devices. For example, an upload service might determine that only a maximum number of total or concurrent uploads will be accepted. If that number is reached, the upload service could deny any upload requests or could provide the player with information that a maximum number has been reached, could set a future upload time for that user, or can notify the user when the number of uploads drops below the maximum number, among other such options. Similarly the upload service, or a related service, can analyze the uploaded media to determine when a target number of streams or uploads is received that satisfies one of more quality or output criteria, whereby an aggregated output can be generated with at least a target level of quality, for example, after which the upload service can notify the upload applications that no further uploads will be accepted for a particular event.

Once at least some media is uploaded for an event, the media can be stored (at least temporarily) to a folder or other repository corresponding to the event. For streaming uploads such storage may be optional, or packets may be buffered for a short period of time in memory, among other such options. The media "clips" can be identified by at least start and stop time, in order to determine where each media clip fits in with respect to a timeline of the overall event. For smartphone and other devices with mobile data plans, the devices will all share a common time, within a determined amount of deviation, based on the timing information provided from the carrier networks. If the device loses connection for a period of time then the time reported by the device clock might drift over a period of time. Some amount of content verification or analysis can be performed in some embodiments to attempt to ensure synchronization, while in other embodiments connection information might be indicated for a particular upload to determine whether or not synchronization analysis should be applied. In some embodiments media from devices that lost connection for a period of time may not be accepted, or may be filtered out as being potentially out of synchronization with other content, particularly for systems that rely upon the time codes for synchronization.

Once the start time and end time for each file is determined, or at least a start time for streaming options, and any appropriate filtering or processing has been applied, a media content generation service can analyze the content and attempt to aggregate content from multiple sources into a single media output, or set of potential media output files or streams. For example, several files might be uploaded for a portion of event that are in landscape orientation and in a similar format, such as a high definition (HD) video format. The service can select a number of these files, such as four files, and determine a layout for those files in a determined output file or stream. For example, the display 500 of FIG. 5 includes an array of video clips 502, 504, 506, 508 that have been stitched together to form a single 4K video format file or stream. The video clips are synchronized in time such that they represent the same time portion of the event, enabling a viewer to get four different views of the event in a single media file. According to various embodiments, an administrator or other entity may establish various parameters for the output (e.g., a single combined stream or a stream in the array of clips); for example, not landscape, having a threshold brightness level or other video quality, being longer than a threshold duration, etc.

In one embodiment, an output video file can start with a blank screen (i.e., a set of video frames that are a single color, such as with all black or all white pixels) and the screen can be logically divided into sections that will correspond to individual clips provided from various client or user devices. In some embodiments the sections will have a size corresponding to the size of the video that was uploaded, such as the situation 500 in FIG. 5A where the 4K video frame is divided into four sections each having the size of a frame of HD video, where 4K format has a size that is four times that of HD video. In other embodiments the size and/or number of sections can be selected or determined for other reasons, and the individual video clips can be resized, zoomed, reformatted, or otherwise adjusted accordingly. The content aggregation server can then overlay video clips, files, or streams into the sections based upon factors such as starting time, size, and orientation. In some embodiments there will be a frame of video in each section for each displayed frame of the aggregated video, while in other embodiments there may be periods of black or blank pixels for certain sections between clips, or the layout or number of sections might adjust based on the clips available for a particular time range of the event, among other such options. In some embodiments a determined number of blank frames or length of transition time may be injected in order to provide for a more seamless transition between clips that is less likely to be distracting or jarring. In some embodiments transitions such as wipes or fades between clips can be used as well within the scope of the various embodiments.

Such a content file, feed, or stream can enable a viewer to concurrently view multiple video clips for an event gathered from multiple different sources. If the content is being played through a device or application that provides appropriate support, the viewer can also have the ability to modify the display to obtain different audio and/or video presentations. For example, in FIG. 5A the user can use a finger 510 to contact a touch-sensitive display at a location associated with one of the video clips. Various other selection mechanisms can be utilized as known in the art for electronic content selection, such as may use a cursor, stylus, tab key, and the like. Once a particular clip is selected, that clip can become the primary display, as illustrated in the example situation 550 of FIG. 5B. Such support can enable a user to initially view several clips concurrently in a single feed, and then quickly determine which of the clips the user is interested in viewing. In addition to being quick for the user, such an approach can also conserve bandwidth since the content is aggregated into a single feed. In situations where the individual clips are provided at the appropriate resolution, for example, the individual clip might be selected by the media player and presented at the appropriate resolution. In other situations, such as where it might be desirable to instead receive a 4K stream of the selected clip, the player might contact a content delivery network or other such system or service, which can then cause the stream to be switched to a 4K version of that clip, if available. In other embodiments the HD (or other) format stream might be sent even though the resolution may not be higher than in the aggregated stream, but the HD stream will conserve bandwidth relative to the 4K stream, particularly when only one of the aggregated HD clips is being displayed.

In at least some embodiments the player or interface can also enable the user to switch between audio and video streams, or otherwise adjust the display of content. For example, in FIG. 5A the interface includes selectable buttons 514, 516 or elements that enable a viewer to scroll, select, or otherwise switch between the various audio and/or video options for the media file. Although buttons are shown, various other selection options can be used as well as discussed and suggested elsewhere herein, and as would be apparent to one of ordinary skill in the art in light of the teachings and suggestions contained herein. In the view illustrated in FIG. 5A, there are four concurrently displayed video clips, and the user can select to display any subset of those four, including a specific video clip as illustrated in FIG. 5B. The user can have the option of switching to a different single video clip, scrolling or scanning between the individual video clips, etc. The interface 552 in FIG. 5B also includes a selectable option 552 enabling the user to quickly instruct the player to display the aggregated video file including all the concurrently available clips for the media file, or at least a larger subset, among other such options. As discussed, this can cause the other media clip data sent to the player to be displayed, or can cause a content delivery network to provide a different data stream to the player, among other such options. The user can also have the option to change the layout, size of respective clips regions, or other aspects in various embodiments.

Figure 5A:
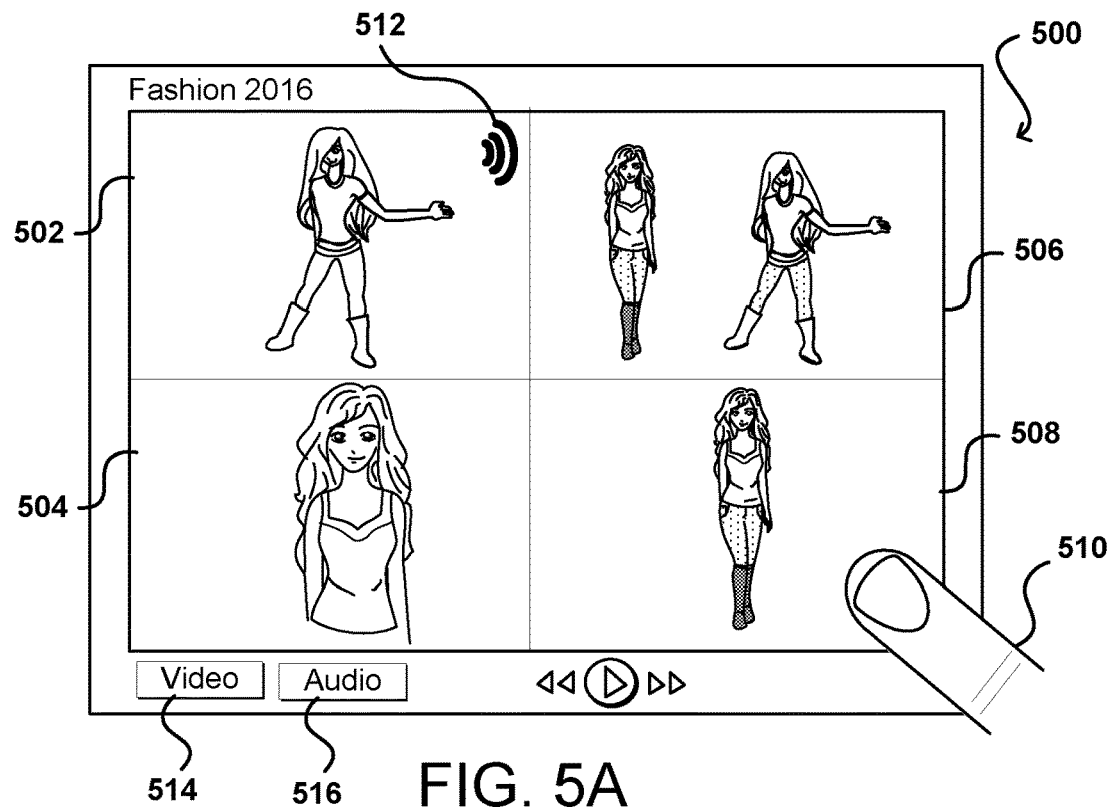
FIGS. 5A and 5B illustrate example displays of event content that can be provided in accordance with various embodiments.
Figure 5B:
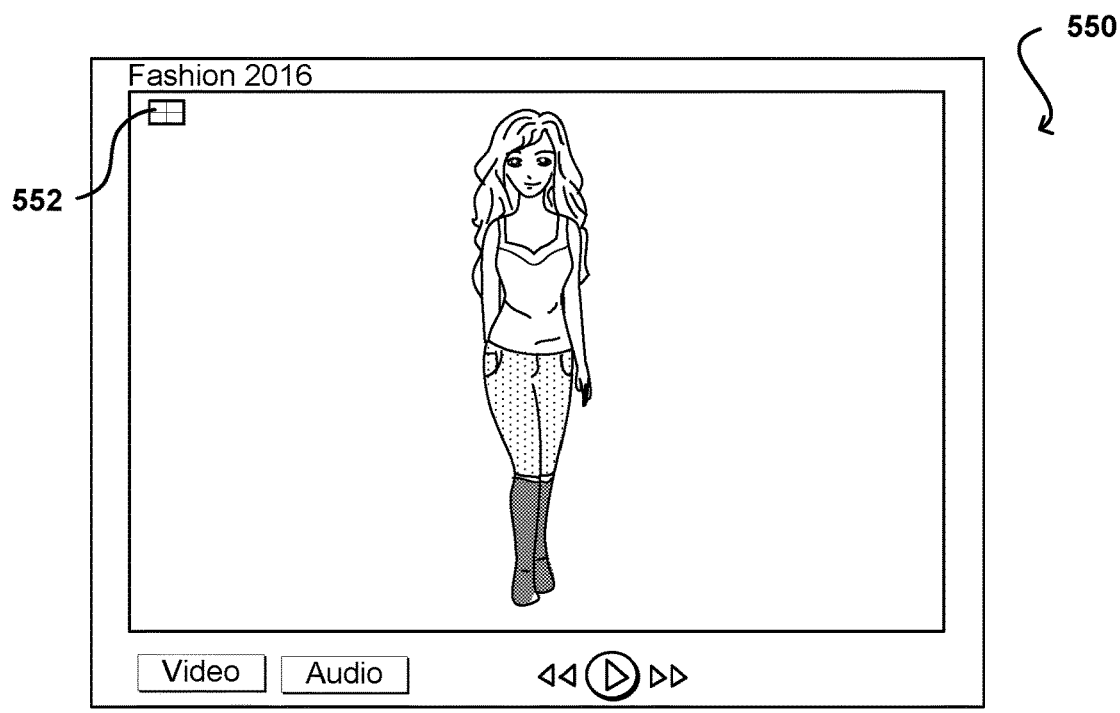

FIG. 5A also provides a graphical indicator 512 of which an audio track is currently playing. The graphical indicator 512 in this example indicates that the audio currently playing is the audio that was captured with the respective video clip 502. In some embodiments a single audio track can be provided, which could have been obtained from one or more of the media uploads for an event. The audio thus might correspond to one of the video clips or might have been received with a different video clip, or received without video data, in various embodiments. Because the audio clips and video clips are synchronized, the audio track can be selected based upon various audible criteria regardless of whether it was originally associated with any of the selected audio. In other embodiments there may be audio provided for each of the video clips, and the user can have the option of playing a different audio clip with the aggregated video view as in FIG. 5A, or can cause the specific audio track to be played with the respective video as in FIG. 5B. Various other options and combinations can be utilized as well within the scope of the various embodiments.

As mentioned, the layout and number of video clips to be aggregated can be predetermined or fixed, or can be determined dynamically based at least in part upon the number, type, and quality of clips received for any period of time during an event. For example, in some embodiments only video content of a certain size, resolution, or format, such as HD video, may be accepted, and there might be a specified orientation as well, such as portrait or landscape orientation. Based on such requirements, there might be a fixed grid layout, or number of possible grid layouts, that can be used that fit that orientation. If it is a 2×2 grid layout for HD video in a 4K video feed, then the system can select four video clips for a period of time based on various criteria as discussed herein, and if there are less than four video clips that meet the criteria then the aggregated video might include black space, white space, advertising, event description, related social media content, and the like. This may occur for any length of time as determined based upon the available content. In some embodiments aggregated views might only be used when there are more than two potential clips available.

For embodiments where multiple sizes, formats, and/or resolutions are allowed, or where resizing of a video clip is supported, there can be a number of layout options provided, where the aggregation service can select the appropriate or optimal layout based on the available video clips for a portion of the event. The grid can be selected, video clips overlaid or selected for regions of the grid, then the video stitched together using any of a number of different approaches for stitching different video content into a single video file or stream. In some embodiments a packing or layout algorithm can be used to dynamically determine an appropriate or optimal layout for the available and/or selected content. For example, if there are two clips in landscape orientation at a first size, one clip in portrait orientation at the first size, and three clips in landscape at a second size, the algorithm can look at various factors and weightings to determine an appropriate layout. The factors can include, for example, minimizing the amount of display space that does not include a portion of a video clip, or the amount of unused space between or around clips, as well as minimizing the amount of resizing or processing needed to be performed. Further, criteria can be used such as minimum size criteria, as smaller clips can improve packing and minimize dead space in the display, but clips that are too small can lack sufficient detail and be of relatively little value to the viewer. Further, aggregating large numbers of clips that have to be resized can be very resource intensive, and may not provide sufficient advantages to warrant the additional resource cost. In some embodiments clips can even be partially overlaid over each other, and users enabled to move the relative locations and overlaying of the individual clips, among other such options.

Figure 6:
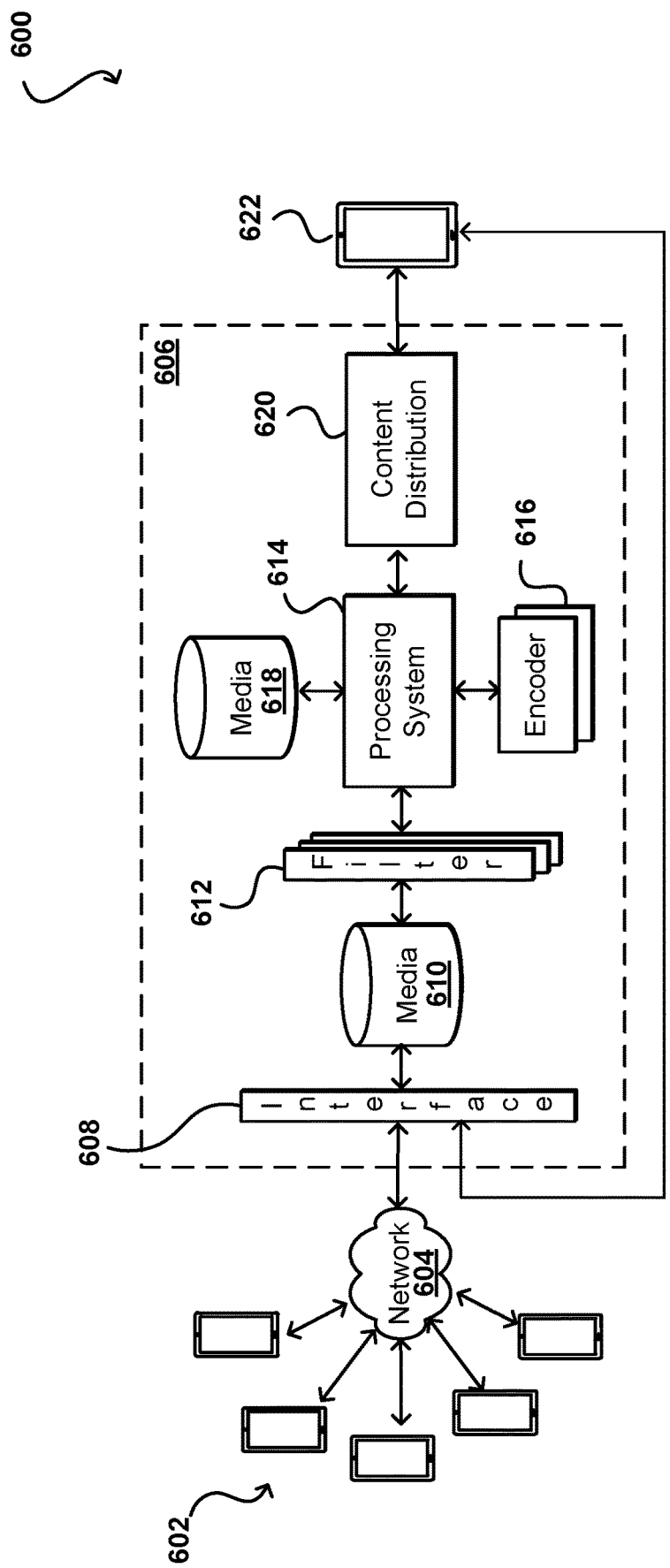
FIG. 6 illustrates an example system that can be used to provide event content in accordance with various embodiments.

FIG. 6 illustrates an example system 600 that can be used to implement aspects of the various embodiments. In this example, various client devices 602 can upload media content over one or more networks 604 to be received to an interface layer 608 of a content provider environment 606. The content provider can be a shared resource environment, as discussed with respect to FIG. 1, or a dedicated network used by the content provider as part of a content service offering, among other such options. As mentioned, the client devices 602 can be running an application or otherwise interacting with an interface that enables captured content to be associated with an event and then stored to an appropriate media repository 610 of the content provider environment. As mentioned, there can be a dedicated upload interface or address for each event, as well as a dedicated file folder for each event, in some embodiments, while in other embodiments content for various events can be tagged with event identifying data then stored to a large media repository, among other such options. For live streaming options the media repository 610 may act as a cache or buffer, while for other options the repository might store the data until sufficient data has been received or an aggregation process in executed, etc.

In this example a processing system 614 can be tasked with analyzing, aggregating, or otherwise generating media content that can be output for display or other presentation on one or more client devices 622. The processing system can include various processing components such as host machines, virtual machines, and the like. The processing system 614, which can also be offered as a service from inside or external to the content provider environment, can obtain the media content from the media repository 610 and cause one or more filters 612 to be applied to the content. As mentioned, the filters can attempt to remove any content that does not satisfy at least minimum selection criteria, rules, or policies. For example, filters might remove from consideration any files that are not of a specified format, resolution, minimum or maximum length, size range, orientation, or time period. Other filters might be used as well that might not remove the clips from consideration but might be used to rank those clips for potential selection, such as may include sharpness, blurriness, brightness, contrast, view, capture location, or amount of movement for video content, as well as volume, background noise, and dynamic range for audio content. For example, even if two video clips are of high quality the filters might cause one of them to be removed from consideration if they are from similar capture locations and directions, with similar fields of view, such that the content of each of the clips is not sufficiently distinct from the other, where there may be little advantage of showing both clips over just one of those clips. Various other filters can be applied as well as discussed and suggested elsewhere herein. Further, at least some of these filters can be applied on the client devices 602 before upload. These filters can analyze the captured media content and analyze the content before uploading, or can potentially apply the filters before the capture of the content. For example, if a certain format or orientation is required and a user attempts to capture and upload content with a different format or orientation, then an application on the device might notify the user before capture that the content does not qualify for inclusion in the aggregated media content for the event, such that the user can make any appropriate adjustments. In some instances the content adjustments might be made automatically, such as to capture in an appropriate format or resize to a specified size, while other adjustment might need to be made manually, such as to capture with a certain device orientation or adjust the amount of ambient lighting, etc.

The processing system 614 can receive or obtain the video content after the filtering and analyze the media content to determine which audio, video, text, or other content to include in the aggregated file or stream. The processing system can cause the content to be stitched or otherwise aggregated into a common media file, for example, using various encoders 616, transcoders, aggregating servers, audio processing algorithms, or other such components, systems, or services. The stitching can be performed using clips in a logical order based on time codes or other such information. In at least some embodiments metadata for the individual clips or elements can be written to the output file in order to enable those clips to be subsequently selected or identified. The produced media can be written to the same media repository 610 or a different media repository 618, which can store the content for subsequent access or buffer the content for live streaming, among other such options. When the content is to be provided for presentation via a client device 622 or other such system, a content distribution system 620, service, or network can obtain the appropriate data from the repository 618 and cause that content to be provided to the client device 622. As mentioned, the device can have the ability to change the feed, stream, or file being received, such as by sending a request to the content distribution system 620 for a new stream, feed, or file, which may correspond to a specific clip or set of clips, different audio track, etc. There may also be different versions of the stream, such as may have different sizes, qualities, or formats, from which a viewer can choose. The client device can also potentially upload content related to the event through the interface layer 608 for potential inclusion in subsequent streams, feeds, or files for the event. In some embodiments the client device 622 can be able to rate or provide feedback on the media content, including individual clips or components, which can then be used to adjust or update the selection of clips used for future versions or streams of content for that event. A user can also be notified if one of their clips is added into an event stream, including information regarding the time period during which their clips can be viewed, listened to, or otherwise accessed.

As mentioned, in some embodiments information for the event might be published, such that a user can select to provide content for the event. An application on the device can (or as part of the content service) can then cause the content to be uploaded and associated with the event. In other embodiments the device might initiate capture and tag the media with location and timing information, which can subsequently enable that media content to be associated with the event. In still other embodiments the user can later associate the content with the event, among other such options. Event files or schedules can also be created in the system in response to requests from users, the service provider, an event sponsor, or third party providers, among other such options.

Figure 7:
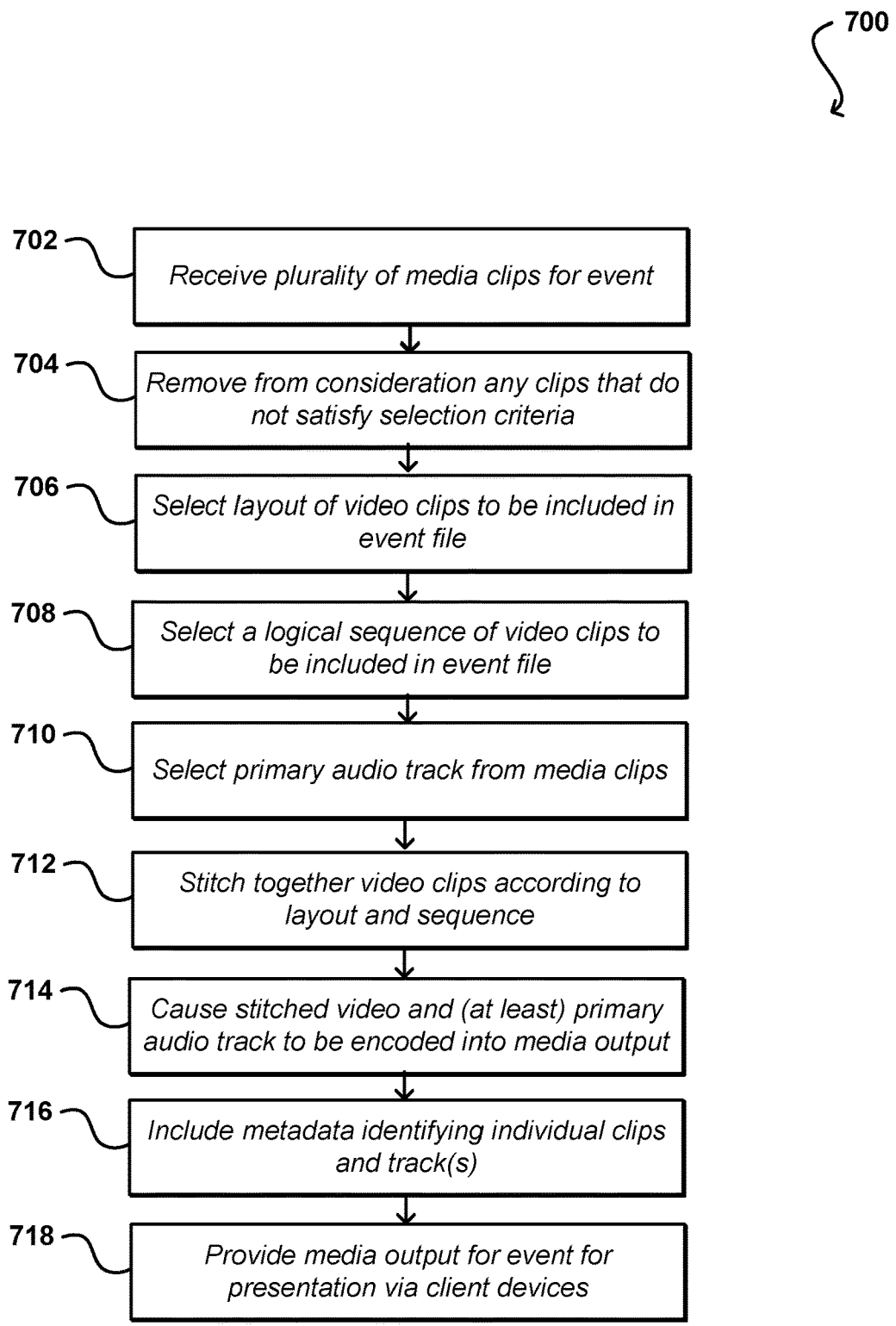
FIG. 7 illustrates an example process for providing event content from multiple sources that can be utilized in accordance with various embodiments.

FIG. 7 illustrates an example process 700 for providing a media file for an event including content from multiple sources that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a plurality of media clips are received 702 from a plurality of different sources. This can include, for example, media content captured by several different devices that may be associated with several different users or sources. The clips can be received in response to a request for content, scheduled event, or spontaneous upload, among other such options. Further, the media clips can be associated with the event through a determined interface or address used to update the content or event tags specified for the content. In other embodiments, metadata such as a time and location of the capture can be used to determine that various media files are related to a particular event.

The various clips can be analyzed to determine various aspects of the clips, and some of the clips can be removed 704 from consideration for inclusion in the event output file where those clips to not satisfy various selection criteria. As mentioned, this can include removing clips that do not have the specified resolution, size, format, orientation, and other such aspects. At least some of this filtering can also be performed on the client device before upload, or at other appropriate times or locations. A layout of video clips to be included in the output file can be selected 706 or otherwise determined. This can be based at least in part upon factors such as the format of the output file, as well as potentially information such as the number of clips received, format or quality of the clips received, etc. As mentioned, the layout can be a static layout that will not change over the duration of the event, or a layout that can be dynamically modified based upon changing clips or other such aspects. A logical sequence of video clips can be selected 708 based at least in part upon the format. The logical sequence can be based at least in part upon time codes between a start time and an end time for the event. The selection can include an appropriate amount of concurrent clips for each time code, such as up to a maximum number of clips, and the number to be included can depend upon the aspect ratios or orientation of the available clips, as there be a different number of landscape clips used than portrait clips, etc. At least a primary audio track can also be selected 710 for the event output file. This can be a single track selected from the uploaded files for a duration of the event, a sequence of tracks corresponding to video clips shown in a region of the layout, or a sequence of clips from various uploads where the audio is sequenced to the video but may correspond to various audio and/or video clips from different times, and may even take advantage of multiple concurrent sound clips for purposes of background sound removal, noise reduction, and the like. As mentioned, in some embodiments individual audio tracks can be included for each layout region and/or video clip included in the output file, among other such options.

Once at least an initial set of video and/or audio clips is selected, along with any other relevant media streams or content, the content can be stitched together 712 according to the video layout, logical sequence, and other such aspects. As mentioned, this can include determining the appropriate layout for a given frame and overlaying the video content from the appropriate selected clips. The stitched together (or otherwise aggregated) video content and at least the primary audio track can be encoded 714 into a media output, such as a file or stream, for the event. As mentioned, in some embodiments there may be multiple versions encoded, as may correspond to different formats, sizes, resolutions, or other such aspects. There can also be versions encoded for the individual selected clips, regions of the layout, or other such portions of the event content. Metadata for the individual clips and tracks can be stored 716 to the media output as well, as may be used to identify the clips and tracks during playback or other use of the media output. The output can be provided 718 for presentation via client devices. If the output is streaming output, then the output file can be buffered as it is created but sent out to the various subscribing or viewing devices in near real time. In other embodiments the entire file might be created and then made available to the devices via streaming, download, or other such transmission or consumption.

Figure 8:
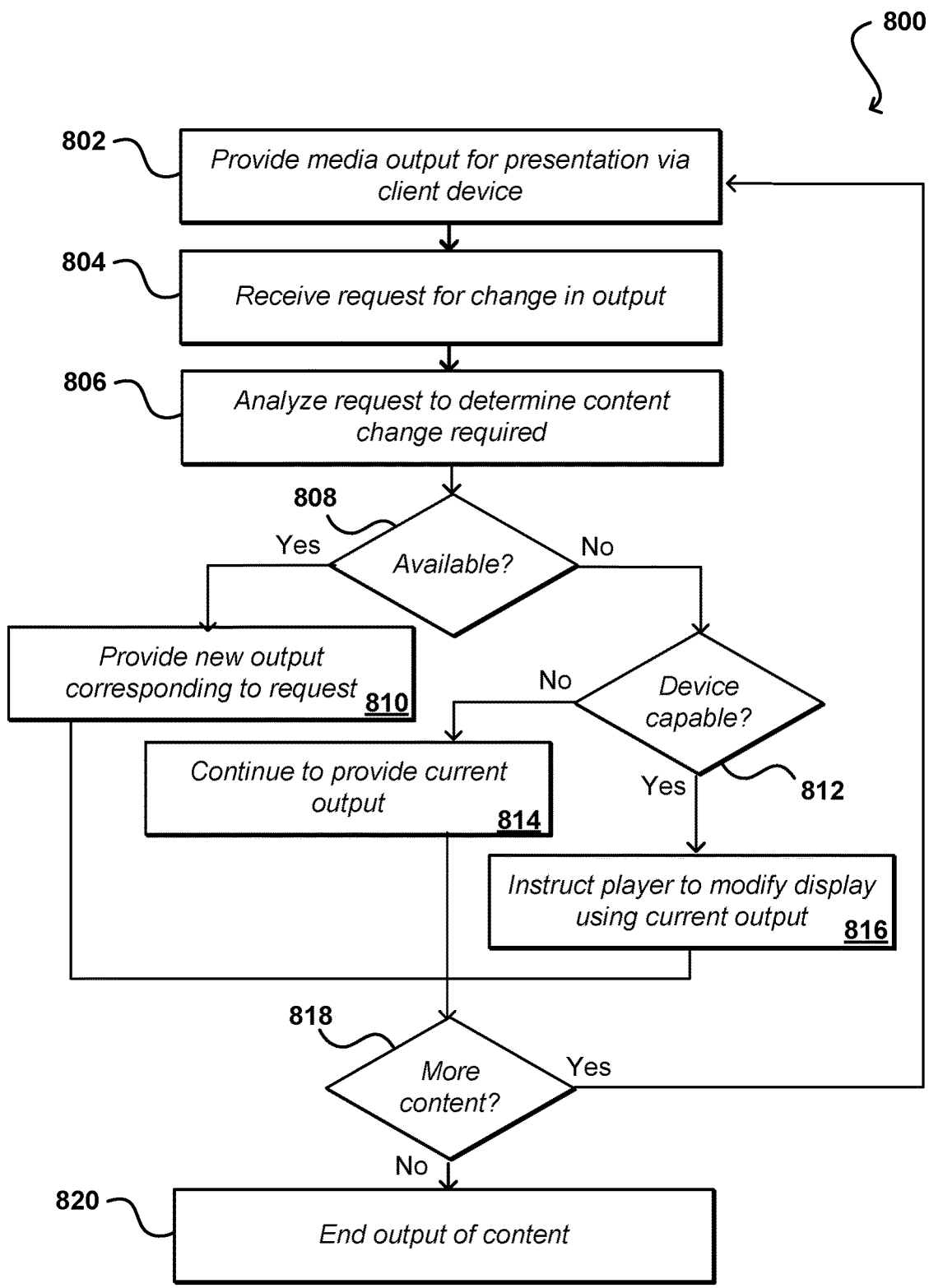
FIG. 8 illustrates an example process for changing the content streamed to a client device for an event that can be utilized in accordance with various embodiments.

FIG. 8 illustrates an example process 800 for modifying the display of such a media output file that can be utilized in accordance with various embodiments. In this embodiment, a media output, such as a file or stream, is provided 802 for presentation via a client device. The stream could be a live stream or a stream from a stored file, among other such options. As mentioned, there can be various media files or tracks stitched into the media output, and in some embodiments the media player or other application on the device may be able to display some of those clips or switch between tracks from the media output file. In other situations, however, either the player may not be able to support such functionality, or a higher quality version might be available. For example, if the player is playing a 4K stream but the user wants to view only one of the included clips, then the player would have to upscale the clip to 4K, which would result in a lower quality image than if the player received a 4K stream of that video clip. Various other reasons for obtaining a different stream of file may occur as well as discussed and suggested elsewhere herein. In response to a request from a user, at least one that cannot be performed adequately by the player using the current stream, a request can be received 804 that corresponds to a potential output change. The information in the request can be analyzed 806 to determine the change in the content that would be needed to provide the requested change. A determination can be made 808 as to whether such output is available to provide to the player, either from an existing file or stream or whether one can be dynamically generated to satisfy the request. If so, the new output can be identified or generated, and then provided 810 as new media output corresponding to the request and provided to the media player.

If such output is not available for the request, a few options can be presented. In this example, a determination can be made 812 as to whether the device or media player is capable of making the change using the current content. For example, it can be determined whether the device is capable of showing only a specific video feed even if it will be of a lower quality than what could otherwise be provided. This might be the result of a zoom operation instead of a specific stream selection, etc. If not, the request can be denied and the current output can be provided 814 and displayed by the media player on the device. A notification may be generated indicating that the requested option is not available or supported, etc. If the device is determined to be capable of providing at least some version of the requested change, while still satisfying any relevant minimum quality criteria, the player can be instructed 816 to modify the display using the data from the existing event media output. As mentioned, this can include displaying a specific video clip, switching to a specific audio track, or performing another such action based on the data already being provided in the current stream. This process can continue while it is determined 818 there is more content to be provided for the event. Once the event ends, the media player stops playback, or there is another such occurrence, the providing of content to the client device can end 820.

Figure 9:
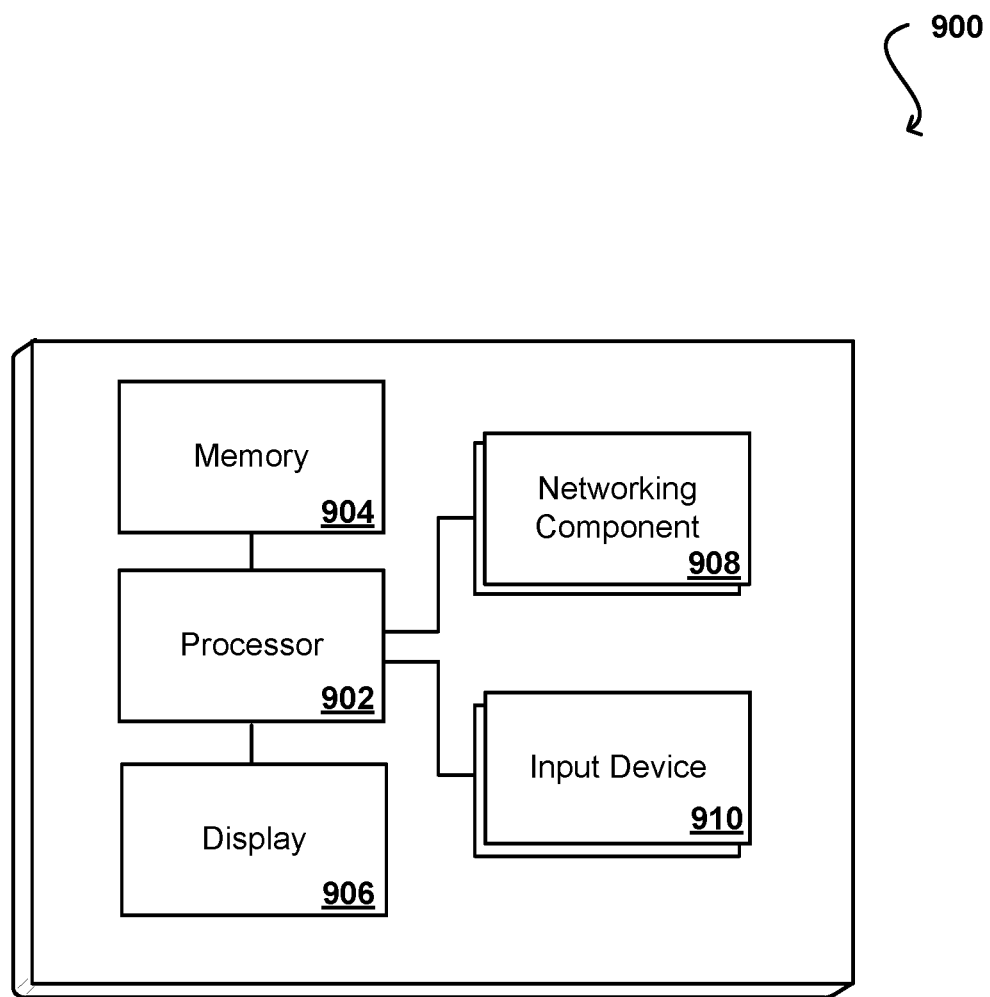
FIG. 9 illustrates example components of a computing device that can be used to implement aspects of various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a plurality of user-generated media inputs related to a particular event from one or more user devices over one or more networks, the plurality of user-generated media inputs captured by the plurality of user devices;
   analyzing the plurality of user-generated media inputs to determine a set of user-generated media files from the plurality of user-generated media inputs for inclusion in a single media output associated with the particular event based on one or more selection criteria, the one or more selection criteria selected from a set comprising resolution, format, aspect ratio, content, image quality, and length;
   arranging the set of user-generated media files logically by time code, the set of user-generated media files including a set of video clips;
   determining a layout for displaying the set of video clips, the layout including at least two display regions;
   combining the set of video clips together according to the layout such that multiple views of the particular event are able to be concurrently displayed via the at least two display regions;
   determining a primary audio track from the set of user-generated media files;
   encoding the set of video clips, arranged per the layout, and at least the primary audio track into the single media output, the single media output including identifying information for the set of video clips and the primary audio track; and
   providing the single media output for presentation via one or more client devices, wherein the set of video clips enables multiple views of the particular event to be presented, concurrently, that are synchronized with the primary audio track.

2. The computer-implemented method of claim 1, further comprising:
   receiving a subsequent request, from an identified client device of the client devices, to change a display of at least one of the layout, the set of video clips, a current audio track, or a displayed audio clip of the media output;
   obtaining a second media output corresponding to the request; and
   providing the second media output to the identified client device in place of any remainder of the media output yet to be transferred.

3. The computer-implemented method of claim 1, further comprising:
   filtering, from the plurality of user-generated media inputs, media inputs that do not have at least one of a specified format, resolution, aspect ratio, or orientation.

4. The computer-implemented method of claim 1, further comprising:
   providing the media output as a data stream for the event.

5. A computer-implemented method, comprising:
   providing, to a plurality of user-operated electronic devices, an interface for uploading user-generated content associated with a particular event;
   receiving a plurality of user-uploaded media files captured by the plurality of user-operated electronic devices over one or more networks, the plurality of user-uploaded media files having respective metadata;
   selecting a set of media files from the plurality of user-uploaded media files based at least in part on the metadata for inclusion in a single media output associated with the particular event;
   filtering out any media files that fail to meet one or more criteria;

determining, from the plurality of user-uploaded media files, a selection of video clips to be concurrently presented according to a layout, the selection of video clips being ordered by time of capture, the layout including at least two regions for displaying video clips of the selection;

determining, from the set of user-uploaded media files, a primary audio track;

encoding the selection of video clips and at least the primary audio track into the media output; and providing the media output for presentation via at least one client device, wherein the selection of video clips is synchronized with the primary audio track.

6. The computer-implemented method of claim 5, further comprising:

enabling users to enroll to upload the plurality of user-uploaded media files for the particular event; and receiving the plurality of user-uploaded media files to the interface.

7. The computer-implemented method of claim 5, further comprising:

determining a sequence of video clips to be displayed in a specific region of the determined layout, wherein each clip of the sequence of video clips represents a respective time duration of the particular event.

8. The computer-implemented method of claim 5, further comprising:

generating the primary audio track using audio clips received with the set of media files, the set of media files capable of including one or more audio clips without video content, the primary audio track including a continuous audio representation of the particular event for a duration of the event.

9. The computer-implemented method of claim 5, further comprising:

receiving one or more presentation parameters associated with the interface, wherein the media output is encoded according to the one or more presentation parameters.

10. The computer-implemented method of claim 5, further comprising:

removing, from consideration for the media output, video clips that contain a view of the event that is within a similarity threshold of another video clip over a determined period of the event.

11. The computer-implemented method of claim 5, further comprising:

including, in the media output, an audio clip for each video clip selected for the media output, wherein a media player presenting the media output is capable of switching from the primary audio track to the audio clips for a respective video clip playing through the media player.

12. The computer-implemented method of claim 5, further comprising:

adjusting, using a packing algorithm, the layout for the media output based at least in part upon a selection of video clips available for a time period of the particular event, the adjusting based further at least in part upon at least one of an orientation or a size of the selection of video clips for the time period.

13. The computer-implemented method of claim 5, further comprising:

identifying one or more of the media files associated with the particular event based at least in part upon a location and time of capture of the one or more media clips.

14. The computer-implemented method of claim 5 wherein the one or more criteria includes at least one of format, resolution, aspect ratio, orientation, resolution, contrast level, static video content, amount of background noise, or determined clip length for the particular event.

15. The computer-implemented method of claim 5, further comprising:

providing, to each of the plurality of electronic devices, a time window for capturing content relating to the particular event.

16. The computer-implemented method of claim 5, further comprising:

synchronizing the video clips and the primary audio track using time codes present in the media files, the synchronizing further capable of including at least one of a video comparison or an audio comparison of at least a subset of the media files.

17. A system, comprising:

at least one processor; and memory including instructions that, when executed by the system, cause the system to:

obtain a plurality of user-uploaded media clips captured by a plurality of user devices and received over one or more networks, the plurality of user-uploaded media clips having respective metadata;

select a set of media clips from the plurality of user-uploaded media clips based at least in part on the metadata for inclusion in a single media output associated with a particular event, the set of media clips including video clips representing different views of respective portions of the particular event;

filter out any media files that fail to meet one or more criteria;

order the of user-uploaded media clips by time of capture;

determine, from the plurality of user-uploaded media clips, a primary audio track;

encode the video clips and the primary audio track into the media output; and provide the media output for presentation via at least one client device, wherein video clips are synchronized with the primary audio track to provide multiple concurrent views of the event.

18. The system of claim 17, wherein the instructions when executed further cause the system to:

determine a sequence of video clips to be displayed in a specific region of a layout, wherein each of the sequence of video clips represents a respective time duration of the event.

19. The system of claim 17, wherein the instructions when executed further cause the system to:

generate the primary audio track using audio clips from the set of media clips, the set of media clips capable of including one or more audio clips without video content, the primary audio track including a continuous audio representation of the event for a duration of the event.

20. The system of claim 17, wherein the instructions when executed further cause the system to:

determine a layout such that each video clip of the media output is displayed at a resolution at which the video clip was received.

* * * * *